Dec. 22, 1936.  H. CARPENTER  2,065,169
PRUNE GATHERER
Filed Nov. 2, 1935  2 Sheets-Sheet 1

INVENTOR
*H. Carpenter*
BY
ATTORNEY

INVENTOR
H. Carpenter
ATTORNEY

Patented Dec. 22, 1936

2,065,169

UNITED STATES PATENT OFFICE 2,065,169

PRUNE GATHERER

Harrison Carpenter, Ceres, Calif.

Application November 2, 1935, Serial No. 47,985

4 Claims. (Cl. 56—328)

This invention relates to machines for gathering prunes, nuts and other tree products from the ground under the trees. Products such as the above are shaken, when ripe, from the trees onto the ground and are then gathered up and placed in receptacles to be taken to the packing or other sheds for the necessary treatment before being placed on sale or otherwise disposed of. At present, this gathering is mainly done by hand, which is a somewhat slow and inefficient method.

The principal object of my invention is to eliminate this manual operation by providing a machine adapted to be mounted in connection with a vehicle such as a motor truck, by means of which the prunes and the like may be quickly and efficiently gathered from the ground and discharged into receptacles with the movement of the vehicle. A further object is to provide means whereby most foreign matter, such as clods, twigs, etc. will be separated from the prunes before they are delivered into the receptacles.

These objects I accomplish by means of such structure and relative arrangement of parts as will fully appear by a perusal of the following specification and claims.

In the drawings similar characters of reference indicate corresponding parts in the several views.

Figure 1:
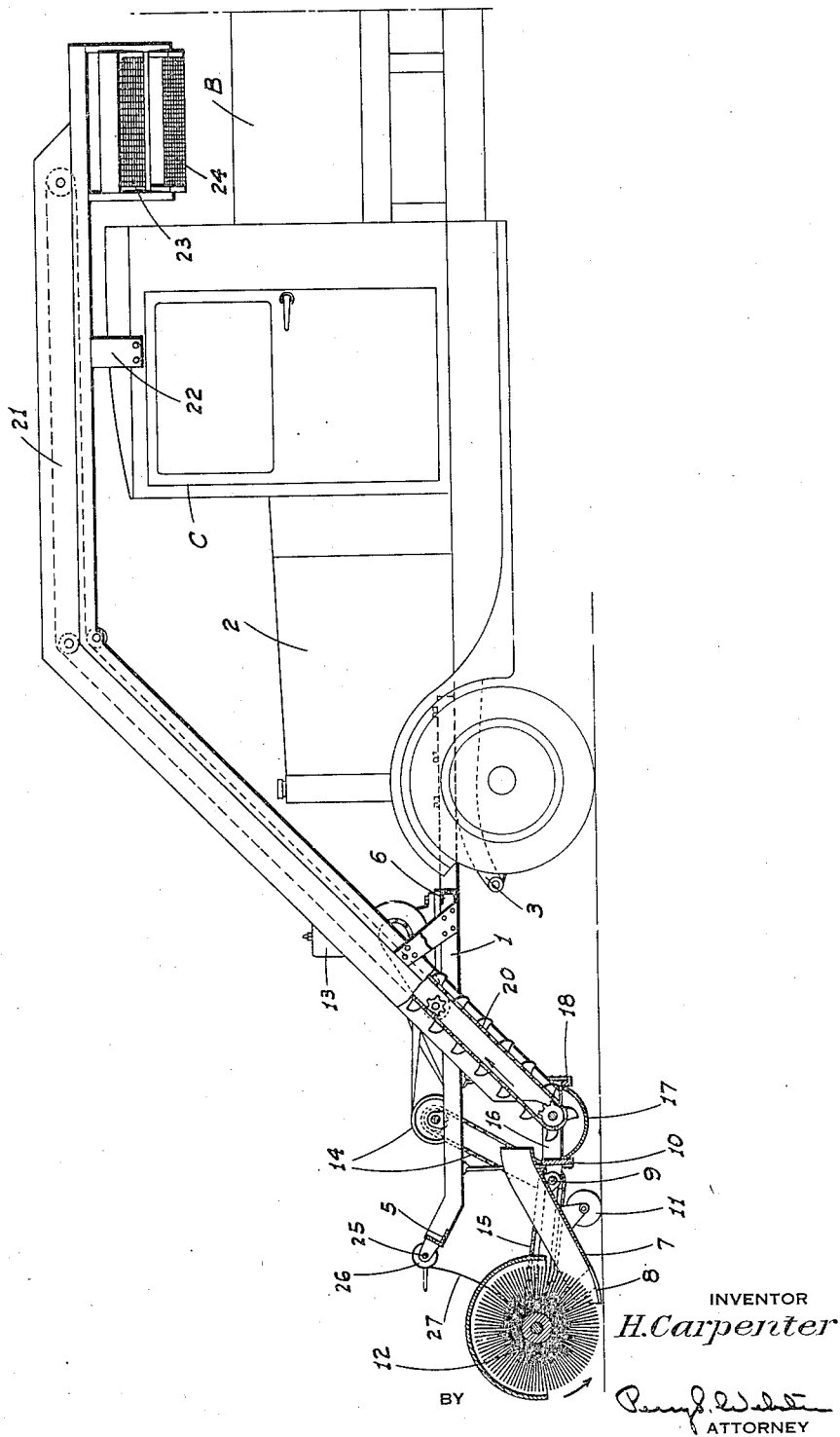
Fig. 1 is a side elevation of my improved machine as mounted on a conventional form of truck.

Referring now more particularly to the characters of reference on the drawings, the machine in the form herein shown comprises a pair of frame beams 1 projecting forwardly from the truck, or other vehicle 2, and preferably extending in alinement with and secured to the side frames 3 of the vehicle in any suitable manner. Ahead of the vehicle are other beams 4 disposed outwardly of and parallel to the beams 1, and tied thereto by a front cross-beam 5 and a rear cross-beam 6. In this manner I provide a rigid framework for the support of the gathering mechanism, and which may be as wide or wider than the overall width of the vehicle.

Figure 2:
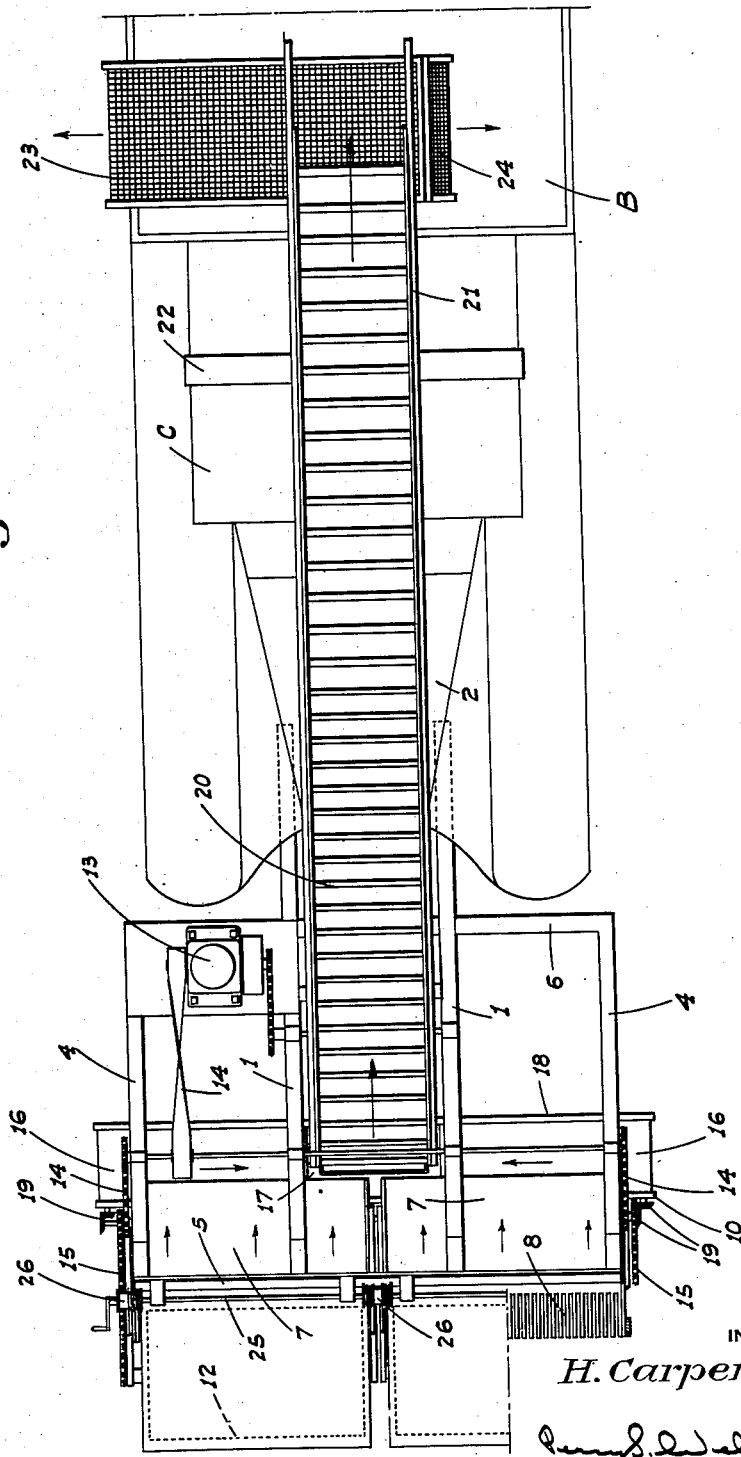
Fig. 2 is a top plan view of the same, one of the rotary brushes being partly broken away.

The gathering mechanism which is mounted under the supporting frame in the front end of the same, preferably consists of two or more transversely alined and independent units as shown in Fig. 2. Each such unit comprises a scoop 7 sloping upwardly from its front end, the forwardly portion of the scoop being formed as a comb or closely spaced fingers 8. The scoop is turnably mounted adjacent its rear end on a cross-shaft 9 thereunder, which is supported from a cross-beam 10 set on edge and disposed under the scoop back of said shaft. This cross-beam is supported from the frame beams 1 and 4 in any suitable manner. A ground-engaging roller 11, or the like, is mounted on and under the scoop, so as to follow the ground undulations and maintain the fingers in close proximity to the ground. The use of a comb or finger arrangement enables the prunes to be properly engaged and lifted from the ground, while at the same time preventing small pieces of dirt and similar refuse from being also gathered up.

Journaled in fixed connection with the scoop at its front end and extending for the full width thereof is a rotary brush 12, formed of relatively stiff, but not entirely rigid bristles. This brush is mounted relative to the fingers and the ground so as to engage the prunes just as they become engaged by the fingers, and sweep such prunes onto the scoop. The brush is driven at a speed sufficient to cause the prunes engaged thereby to be impelled to the upper rear end of the scoop by suitable power means. In the present instance I have shown such means as being a gas engine 13 mounted on the main supporting frame to one side of the same, and having drive connections 14 to the pivot shaft 9 of the scoops and other connections 15 between said shaft and the brushes of the separate units.

The scoops of the two units discharge onto transversely extending conveyors 16 spaced apart at their adjacent ends, and also into a sump 17 disposed between said conveyors and into which the latter also deliver. The conveyors and sump are supported by and between the cross-beam 10 and a similar cross-beam 18 rearwardly of the beam 10. The conveyers are driven so that their upper runs travel toward each other or toward the sump by suitable drive connections 19 between the ends of the shaft 9 and the adjacent ends of the conveyers.

Depending into the sump is the lower end of an elevator 20 of any suitable type, which is also driven from the gas engine 13. This elevator is mounted in connection with and follows a frame 21 which extends upwardly and rearwardly from the sump over the cab C of the vehicle to a termination over the bed or body B of the vehicle rearwardly of the cab. The frame 21 is secured to the beams 1 and is additionally supported adjacent its rear end by a suitable bracket 22 attached to the cab.

The elevator 20 delivers onto an upper transversely extending screen 23 supported from the rear end of the frame 21. This screen is of sufficiently large mesh to allow the prunes to pass therethrough, but retaining large clods of dirt etc. This screen is set with a downward slant from under the elevator to a termination beyond one side of the body of the vehicle, or so that any matter retained on the screen will roll down the same and be dropped onto the ground. The prunes passing through the screen 23 are received on another transverse screen 24 having a finer mesh so that the prunes will be retained while smaller refuse matter will pass therefrom. The screen 24 has a downward slant directly opposite that of the screen 23 and terminates at its lower end in overhanging relation to the body B.

In this manner the prunes may roll directly from said screen 24 into the body or may be received into boxes successively placed in the proper position by the workers accompanying the vehicle. It is to be noted that the elevator being at the center of width of the vehicle does not interfere with the vision of the driver in steering the vehicle so that the gathering mechanism may be properly directed and engaged with the prune covered areas of the ground.

In order that the gathering mechanism may be raised clear of the ground when the vehicle is being moved from place to place, I may mount a shaft 25 along the front of the cross-beam 5, having small cable drums 26 thereon. Normally slack cables 27 are wound on these drums and extend downwardly to connections with the individual brushes at their opposite ends, or with the scoops at their forward ends. Winding the cables on the drums by rotation of the shaft 25 raises both gathering units simultaneously, said units turning on the common shaft 9 as an axis.

It will be noted that the gathering units, while separate so that they may separately follow any adjacent undulations in the ground, are placed as close together as practicable in order to gather the prunes without material interruption for the full distance between the opposite ends of the gathering units.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. An apparatus for gathering prunes from the ground comprising a frame adapted to be mounted on and project forwardly from a motor truck, prune gathering mechanism mounted on the frame, and an elevator to engage the gathered prunes, adapted to extend lengthwise of and over the top of the truck to a termination above the body thereof.

2. A structure as in claim 1, with a screen to retain matter larger than the prunes, sloping downwardly from under the delivery end of the elevator to a termination adapted to clear the body of the truck, and a member receiving the prunes dropping through said screen extending with a downward slope and adapted to terminate within the confines of the truck body.

3. An apparatus for gathering prunes from the ground comprising a pair of transversely alined, closely disposed gathering units, means supporting said units for movement along the ground, each unit comprising a gathering scoop sloping upwardly and rearwardly from adjacent the ground and means to assist in the gathering action and also functioning to impel the gathered prunes to the upper rear end of the scoop, transverse conveyors onto which the upper ends of the scoops of the two units discharge, said conveyors moving toward each other and being spaced apart at their adjacent ends, a sump between the conveyors into which the latter and the adjacent portions of the scoops discharge, and an elevator depending into the sump to take therefrom.

4. An apparatus for gathering prunes from the ground comprising a forwardly moving unit to gather the prunes from the ground for a predetermined width thereof at one operation and including a relatively wide scoop, transverse conveyors onto which said scoop discharges, said conveyors moving toward each other and being spaced apart at their adjacent ends, a receiving sump between the conveyors into which the latter and adjacent portion of the scoop discharges and an elevator depending into the sump to take therefrom.

HARRISON CARPENTER.